United States Patent

Golan et al.

[11] Patent Number: 6,044,400
[45] Date of Patent: *Mar. 28, 2000

[54] SWITCH MONITORING SYSTEM HAVING A DATA COLLECTION DEVICE USING FILTERS IN PARALLEL ORIENTATION AND FILTER COUNTER FOR COUNTING COMBINATION OF FILTERED EVENTS

[75] Inventors: Oded Golan, Tel Aviv; Rina Tivon, Rosh Ha'ain; Meir Kruk, Ramat Gan; Gil Lebovich, Tel Aviv; Zvika Goldenberg, Petach Tikva; Gilad Pivonya, Moshav Avichail; Mark Perelman, Netanya; Yaron Dician, Tel Aviv, all of Israel

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,324

[22] Filed: Mar. 25, 1995

[51] Int. Cl.[7] .................................................. G06F 13/00
[52] U.S. Cl. ............................................ 709/224; 709/223
[58] Field of Search ............................. 395/200.83, 500, 395/200.65, 200.71; 345/440; 370/252, 401, 232, 452; 709/224, 223

[56] References Cited

U.S. PATENT DOCUMENTS

| | | | |
|---|---|---|---|
| 5,226,120 | 7/1993 | Brown et al. ............................ | 395/200 |
| 5,247,517 | 9/1993 | Ross et al. ............................... | 370/452 |
| 5,276,681 | 1/1994 | Tobagi et al. ........................... | 370/85.4 |
| 5,315,580 | 5/1994 | Phaal ....................................... | 370/232 |
| 5,319,644 | 6/1994 | Liang ...................................... | 370/85.5 |
| 5,440,719 | 8/1995 | Hanes et al. ............................ | 395/500 |
| 5,600,632 | 2/1997 | Schulman ................................ | 370/252 |
| 5,610,905 | 3/1997 | Murthy et al. .......................... | 370/401 |
| 5,615,323 | 3/1997 | Engel et al. ............................. | 345/440 |
| 5,666,488 | 9/1997 | Joh .......................................... | 395/200.83 |
| 5,706,436 | 1/1998 | Lewis et al. ............................ | 395/200.65 |
| 5,712,981 | 1/1998 | McKee et al. .......................... | 395/200.71 |

OTHER PUBLICATIONS

Madison, Phil, 32–Bit CRC Error Detection MACH210 and MACH230, Advanced Micro Devices, AT&T–Paradyne and Gene Crossley, Publication No. 17750, May 1993.

*Primary Examiner*—Le Hien Luu

[57] ABSTRACT

A switch monitoring system including at least one bus having a plurality of switching ports, wherein a multiplicity of data portions travel over the bus, each of the data portions having at least one destination. The system also includes a plurality of workstations connected to the plurality of switching ports, and a data collection device operative to collect at least one of the data portions from the at least one bus which data portion is being transmitted along the at least one bus to at least one destination including at least one destination other than the data collection device.

61 Claims, 6 Drawing Sheets

Microfiche Appendix Included
(8 Microfiche, 698 Pages)

SWITCH MONITORING SYSTEM HAVING A DATA COLLECTION DEVICE USING FILTERS IN PARALLEL ORIENTATION AND FILTER COUNTER FOR COUNTING COMBINATION OF FILTERED EVENTS

REFERENCE TO MICROFICHE APPENDIX

The present specification includes a microfiche appendix having 8 microfiche and 698 frames.

FIELD OF THE INVENTION

The present invention relates to apparatus and methods for LAN switching.

BACKGROUND OF THE INVENTION

Switched networks are problematic for network managers. The very features that make switched networks so efficient also make them difficult to monitor and control. Specifically:
a. Traffic is isolated between two stations.
b. High bandwidth of the switch produces heavy processing requirements.
c. High traffic loads are difficult for the user to interpret.
d. In virtual LAN applications, a large number of virtual LANs need to be monitored.

The state of the art is described by the following U.S. patents: U.S. Pat. No. 5,226,120 to Brown et al; U.S. Pat. No. 5,276,681 to Tobagi et al; U.S. Pat. No. 5,319,644.

The disclosures of all publications mentioned in the specification and of the publications cited therein are hereby incorporated by reference.

SUMMARY OF THE INVENTION

The present invention seeks to provide improved apparatus and methods for monitoring LAN switches.

According to a preferred embodiment of the present invention, each of a plurality of LAN switch ports in a multiport hub is connected to one or more busses through which all switched traffic passes. Therefore, the bus is the central point of the hub and any communication between hosts connected to the bus must travel through this point which is monitored by the apparatus of the present invention.

The switch monitoring shown and described herein is preferably passive in that the monitoring apparatus has no effect on the performance of the LAN switch in the network. As a result, there is no conflict of resources between monitoring and traffic switching, ensuring both high monitoring performance and maximum switching performance.

Preferably, the apparatus of the present invention is also operative to analyze information gathered from the bus by allowing a user to request information from a probe monitoring all switched traffic on the bus. Preferably, bus statistics may be generated by the apparatus of the present invention which provide a global view of traffic passing through the bus.

Preferably, the monitoring process is organized top-down.

The particular embodiment illustrated herein is operative only to collect statistics regarding data packets rather than collecting the data packets themselves. However, in certain applications it may be desirable for the apparatus of the present invention to collect the data packets themselves from the bus or busses and to perform analyses thereof.

There is thus provided in accordance with a preferred embodiment of the present invention a switch monitoring system including at least one bus having a plurality of switching ports, wherein a multiplicity of data portions travel over the bus, each of the data portions having at least one destinations, a plurality of workstations connected to the plurality of switching ports, and a data collection device operative to collect at least one of the data portions from the at least one bus which data portion is being transmitted along the at least one bus to at least one destinations including at least one destination other than the data collection device.

There is also provided in accordance with another preferred embodiment of the present invention a switch monitoring method including providing at least one bus having a plurality of switching ports, wherein a multiplicity of data portions travel over the bus, each of the data portions having at least one destinations, connecting a plurality of workstations to the plurality of switching ports, and providing a data collection device operative to collect at least one of the data portions from the at least one bus which data portion is being transmitted along the at least one bus to at least one destinations including at least one destination other than the data collection device.

There is thus provided in accordance with still another preferred embodiment of the present invention data collection apparatus for a switch system including a plurality of workstations connected to at least one bus over which data travels, the data including a multiplicity of data portions each having at least one destinations, the apparatus including a memory, and data capturing apparatus operative to capture at least one of the data portions from the at least one bus, which data portion is being transmitted along the at least one bus to at least one destinations including at least one destination other than the data capturing apparatus and to store the data portion in the memory.

Further in accordance with a preferred embodiment of the present invention the data capturing apparatus is operative to collect statistics regarding data portions transferred between stations within the switch system.

Still further in accordance with a preferred embodiment of the present invention the data capturing apparatus also includes a selective data processor operative to write to the memory information regarding only data portions having a selected profile.

Additionally in accordance with a preferred embodiment of the present invention the information includes number of occurrences of the data having the selected profile.

Moreover in accordance with a preferred embodiment of the present invention the information includes at least a portion of content of the data having the selected profile.

Further in accordance with a preferred embodiment of the present invention the selective data processor includes a data filter operative to filter out data transmitted along the at least one bus which does not have the selected profile.

Still further in accordance with a preferred embodiment of the present invention the selective data processor includes a selected data analyzer operative to analyze data which has passed the data filter on the fly, thereby to derive the information.

Additionally in accordance with a preferred embodiment of the present invention the data capturing apparatus includes a total data analyzer operative to analyze, on the fly, at least one characteristic of all data traveling over the at least one bus.

Moreover in accordance with a preferred embodiment of the present invention the bus, switching ports and workstations form a LAN.

Further in accordance with a preferred embodiment of the present invention each of the data portions includes a data packet.

There is also provided in accordance with another preferred embodiment of the present invention a data collection method for a switch system including a plurality of workstations connected to at least one bus over which data travels, the data including a multiplicity of data portions each having at least one destinations, the method including providing data capturing apparatus operative to capture at least one of the data portions from the at least one bus, which data portion is being transmitted along the at least one bus to at least one destinations including at least one destination other than the data capturing apparatus, and storing the data portion in the memory.

Further in accordance with a preferred embodiment of the present invention the providing step also includes collecting statistics regarding data portions transferred between stations within the switch system.

Still further in accordance with a preferred embodiment of the present invention the providing step also includes a selective data processing step operative to write to the memory information regarding only data portions having a selected profile.

Additionally in accordance with a preferred embodiment of the present invention the information includes number of occurrences of the data having the selected profile.

Moreover in accordance with a preferred embodiment of the present invention the information includes at least a portion of content of the data having the selected profile.

Further in accordance with a preferred embodiment of the present invention the selective data processing step includes filtering out data transmitted along the at least one bus which does not have the selected profile.

Still further in accordance with a preferred embodiment of the present invention the selective data processing step includes a selected data analysis step operative to analyze data which has passed the data filter on the fly, thereby to derive the information.

Additionally in accordance with a preferred embodiment of the present invention the providing step includes a total data analysis step operative to analyze, on the fly, at least one characteristic of all data traveling over the at least one bus.

The phrase "a plurality of workstations connected to the plurality of switching ports", and like phrases are intended to include both direct workstation-port connections and indirect connections, via an intermediate element such as a buffer.

BRIEF DESCRIPTION OF THE DRAWINGS AND APPENDICES

The present invention will be understood and appreciated from the following detailed description, taken in conjunction with the drawings and appendices in which.

Figure 1:
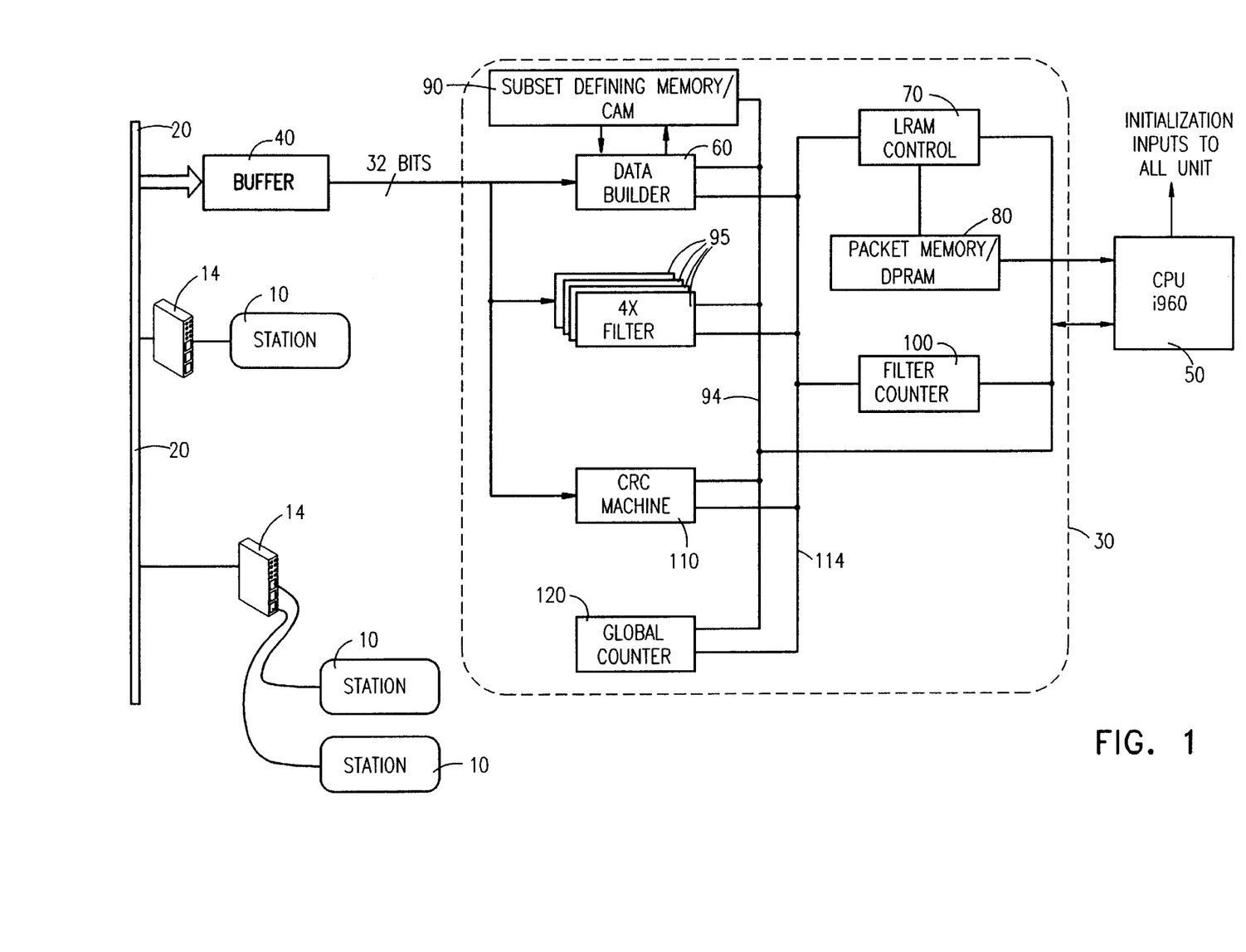
FIG. 1 is a simplified block diagram of LAN switching apparatus constructed and operative in accordance with a preferred embodiment of the present invention.

Attached herewith are the following appendices which aid in the understanding and appreciation of one preferred embodiment of the invention shown and described herein:

Appendix A is a list of components which may be used to construct a board implementing data collection device 30 and buffer 40 of FIG. 1;

Appendix B is a netlist of the above board presented in the format of the View Logic CAD software, commercially available from View Logic Systems Inc. (293 Boston Port Road West, Marlboro, Mass. 01752-4615);

Appendix C is a list of the locations of each of the components of Appendix A on the print side of the board; and Appendix D is a list of the locations of each of the components of Appendix A on the component side of the board; and Appendix E, in ABL format, contains equations useful in generating the GAL 18v10.20 component whose netlist reference is U14;

Appendix F, in ABL format, contains equations useful in generating the GAL 20v8R-5 component whose netlist reference is U24;

Appendix G, in XNF format, is an internal netlist of the Xilinx XC4005-5 component, whose netlist reference is U68;

Appendix H, in ADL format, is an internal netlist of the Actel A1280A component, whose netlist reference is U66;

Appendix I, in ADL format, is an internal netlist of the Actel A1280A component, whose netlist references are U60 and U64;

Appendix J, in ADL format, is an internal netlist of the Actel A1280A component, whose netlist reference is U58;

Appendix K, in ADL format, is an internal netlist of the Actel A1280A component, whose netlist reference is U59;

Appendix L, in ADL format, is an internal netlist of the Actel A1280A component, whose netlist references are U54–U57; and Appendix M is a list of equations useful in computing a 32-bit vector of CRC (cyclic redundancy check) values.

DETAILED DESCRIPTION OF PREFERRED EMBODIMENTS

Reference is now made to FIG. 1 which is a simplified top-level block diagram of a LAN switching system constructed and operative in accordance with a preferred embodiment of the present invention. A plurality of workstations 10 are connected to a corresponding plurality of ports of the LAN switching system via LAN switching cards 14 such as the LSE-808 switching cards commercially available from Madge Networks, 2310 North First Street, San Jose, Calif., USA 95131-1011. Each LAN switching card 14 may be associated with one or more ports and one or more workstations 10.

The LAN switching system of FIG. 1 includes a bus 20, in the illustrated embodiment, such as an LET-36, commercially available from Madge, and more generally, at least one bus, via which the workstations 10 communicate. Also connected to the bus 20 is a data collection device 30 associated with bus 20 via a buffer 40. Preferably, the data collection device 30 is associated with bus 20 by means of a unidirectional connection allowing information to flow from the bus 20 to the data collection device 30 but not from device 30 to bus 20. The data collection device 30 is connected with a CPU 50 which reads data collected by data collection device 30 and performs analyses thereof.

The workstations 10 may, for example, comprise personal computers, workstations, printers, scanners or any other digital electronic equipment. The CPU 50 may, for example, comprise a 32-bit CPU, such as an Intel 960.

The data collection device 30 includes a data builder 60 which is operative to construct a profile of each data packet or other data unit arriving at the data collection device which may, for example, include any or preferably all of the following items of information:

TA—transmission address, i.e. the address of the port associated with the workstation which sent the packet;
DA—MAC (media access control) destination address, i.e. the Ethernet address of the workstation which is to receive the packet;
SA—MAC source address, i.e. the Ethernet address of the workstation which sent the packet;
PT—packet type, e.g. Ethernet, Token Ring, etc.;
PL—packet length, preferably in bytes;
PS—packet status, such as broadcast, multicast, unicast, CRC (cyclic redundancy check) error, packet too long, etc.

An LRAM (local random access memory) controller 70 is operative to receive each of the above profiles from the data builder 60 and to transfer all of the above profiles, or alternatively a selected subset thereof, as described below, to a packet memory 80, which may, for example, comprise two banks of SRAMs or alternatively a DPRAM (dual port RAM) having two virtual banks. Typically, at a given time, one of the banks is being written to by LRAM controller 70 and the other of the two banks is being read from by CPU 50.

A subset defining memory 90 is provided which may, for example, comprise a CAM (content addressable memory), or, if cost is a consideration, an SRAM. The subset defining memory 90 stores a definition of a subset of packets which are deemed by a user to be of interest, whereas all packets not within that subset are regarded as not being of interest. For example, a subset definition may include a designation of an SA and DA in which case the subset may comprise all packets sent from that SA to that DA. Alternatively, the subset definition may include only an SA, in which case the subset may comprise all packets sent from that SA, or the subset definition may comprise any other logical combination of the elements of the profile constructed by data builder 60.

If a subset is defined by the CAM 90, the data builder 60 sets a "reject" flag for each packet, the default being to store the packet, the flag depending on whether the packet's profile does or does not correspond to the subset defined by the CAM 90. Consequently, the LRAM controller 70 does not transfer all packets it receives to the DPRAM 80 but rather only those packets which do not bear a "reject" flag. The aggregation of these packets in the DPRAM 80 comprises a first database, also termed herein the "profile area", storing detailed information regarding the selected subset of packets.

Alternatively or in addition, the LRAM controller may write a second database to the DPRAM 80, which stores general per-port information regarding all packets, whether in the selected subset or not. The area of the DPRAM which stores this information is also termed herein the "counter area". The general per-port information is preferably arranged by sending port and may, for example, include the following counters for each sending port:

a. Number of readable packets sent;
b. Number of readable octets (bytes) sent;
c. Number of packets with CRC error sent;
d. Number of too-long packets.

Preferably, an array 95 of filters, such as four 24-byte long filters, in the present embodiment, is provided in association with a filter counter 100. The filter counter 100 allows the number of occurrences of each of four events (in the illustrated embodiment) to be counted, as well as, preferably, any combination of the four numbers of occurrences, such as the number of occurrences of any of events 1, 2 or 3. If combinations are counted, the number of counters is the $2^{(no.\ of\ filters)}$ of the number of filters, so that, for four filters, 16 counters are provided.

The filters 95 define the events. Specifically, each event is user-defined by allowing the user to select, as by means of an I/O bus 94 between the filter array 95 and the CPU 50, a pattern, a mask and an offset. An event occurs when the "pattern" is found within a packet, which has the defined "offset". The "mask" defines bits within the pattern which are "don't care" bits. Packets which include "events" pass through the filters 95 and are counted by the filter counter 100.

A CRC machine 110 checks the correctness of each received packet and raises a flag whenever a CRC error is detected.

Preferably, the data builder 60, the filter array 95 and the CRC machine 110 are connected in parallel, and the outputs of all of them arrive in parallel at the LRAM controller 70. In the illustrated embodiment, elements 60, 95 and 110 are all connected to an internal performance bus (IPB) 114.

A global counter 120 provides statistics regarding the total traffic traveling over the bus 20. For example, counters may be provided which accumulate statistics regarding any of the following events:

COUNTER EVENT NUMBER
1. Number of good Ethernet broadcast packets;
2. Number of good Ethernet multicast packets;
3. Number of good Ethernet packets;
4. Number of octets contained in good Ethernet packets;
5. Number of Ethernet packets with CRC error or too long (too long=if 1518 bytes<packet length<jabber)
6. Number of octets contained in bad Ethernet packets;
7. Number of packets of non-Ethernet protocol types; and
8. Number of octets contained in packets of non-Ethernet protocol types.

The data builder 60 of FIG. 1 is now described in detail. The data builder 60 has at least two modes of operation, promiscuous mode and filter mode which are defined by a configurable register unit 124 which generates signals C1 and C2, corresponding to the promiscuous and filter modes respectively.

In promiscuous mode, the data builder does not use the CAM 90 of FIG. 1 to filter the data arriving from bus 20. For Ethernet applications, as each Ethernet packet is received from bus 20, the data builder transfers to internal performance bus 114 a data block which, in the illustrated embodiment, includes five 32-bit words, which includes the following information:

TA—transmission address: 1 byte;
Reserved—1 byte:
DA—destination address: 6 bytes;
SA—source address: 6 bytes;
PT—packet type: 2 bytes;
PL—packet length: 13 bits; and
PS—packet status: 19 bits.

The data builder 60 transforms the DA, SA and PT fields into a canonical form by performing byte order changing and/or swapping of bits inside each byte.

For non-Ethernet applications, the same data block is transferred to IPB 114 but, in this case, the data builder issues to the internal performance bus 114 "data reject" and "status reject" signals. These signals inform the LRAM controller 70 that it should reject non-Ethernet packets from the LRAM but should nonetheless update the per-port counters of the first database resident in the DPRAM 80. Alternatively, of course, non-Ethernet packets may be fully analyzed, similarly to the analysis of Ethernet packets described herein.

When the data builder 60 operates in filter mode, the data builder utilizes the CAM 90 for prefiltering in order to reduce the bulk of the data incoming from the switch bus 20. In the illustrated embodiment, the data builder checks both source and destination addresses of each Ethernet packet.

In the illustrated embodiment, the data builder 60, when in filter mode, does not check non-Ethernet packets. These packets are transferred to the internal performance bus 114 as in the promiscuous mode. However, alternatively, the non-Ethernet packets may be fully analyzed, similarly to the analysis of Ethernet packets described herein.

Ethernet packets match the CAM 90 if their destination or source address, or both, are marked in the CAM 90. Matching Ethernet packets are transferred to the internal performance bus as in the Ethernet promiscuous mode.

Ethernet packets that do not match the CAM 90 are transferred to the internal performance bus 114 together with "data reject" and "status reject" signals.

Preferably, each of units 60, 70, 95, 100, 110 and 120 are programmable by CPU 50 via I/O bus 94.

Figure 2:
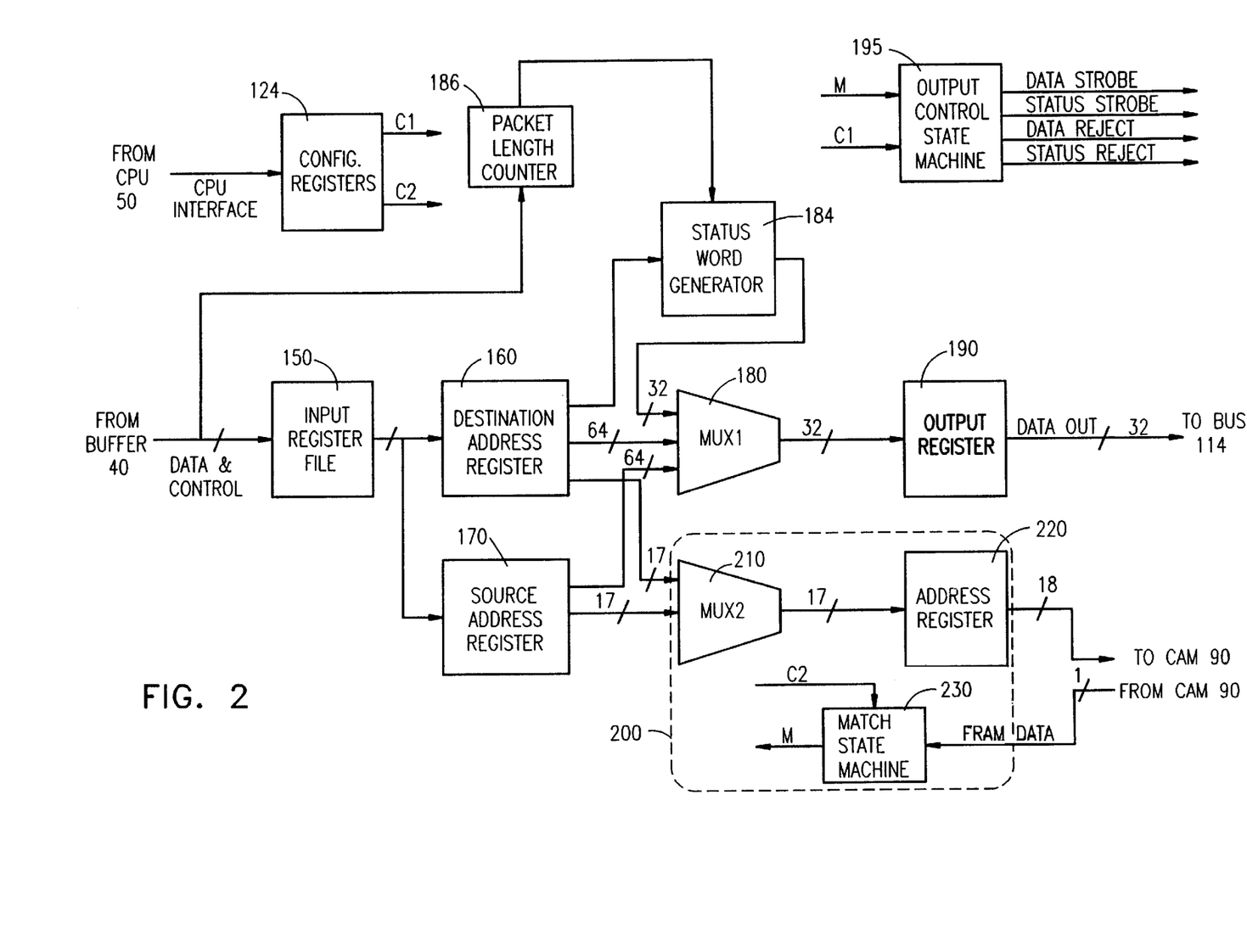
FIG. 2 is a simplified block diagram of the data builder unit of FIG. 1.

Reference is now made to FIG. 2 which is a detailed block diagram of the data builder 60. An input register file 150 transforms the format (e.g. 32-bit, 40 MHz) of input data arriving from buffer 40 to an internal format (e.g. 64-bit, 20 MHz).

The destination and source addresses of the current packet are latched in Destination and Source address registers 160 and 170 respectively. Later on these addresses are sequentially transferred through a multiplexer 180, and an output register 190 to the internal performance bus 114.

The multiplexer 180 also implements byte order changing and bit swapping inside the bytes in order to supply the data to CPU 50 in canonical form.

For each packet received from the bus 20 via buffer 40, the data builder 60 transmits a block of information to the internal performance bus 114. In the illustrated embodiment, this block includes 4 data words and one status word. The status word is collected by a status word generator 184. Part of the status word is an indication of packet length, whose value is determined by a packet length counter 186. The data words are signaled by a 4-clock length signal termed "data strobe" whereas the status word is signaled by a 1-clock length signal termed "status strobe".

If the packet is to be rejected, i.e. is not to be stored in the DPRAM 80, as described below, the data builder 60 asserts a "data reject" signal 1 clock length after transmission of the 4-word data block and asserts a "status reject" signal simultaneously with the "status strobe" signal.

The "data reject" and "status reject" signals force the LRAM controller 70 to reject the currently received packet from the DPRAM 80.

The "data strobe", "status strobe", "data reject" and "status reject" signals are generated by an output control state machine 195.

There are at least two situations in which a packet is rejected:
a. If the packet is non-Ethernet; and b. If the packet is Ethernet but the data builder 60, operating in filter mode, finds that the packet does not match the CAM 90.

A CAM interface 200, including a multiplexer 210 which performs bit swapping inside bytes, an address register 220 and a match state machine 230 provide a path to the CAM and are used for packet match/non-match analyses. For each packet, the data builder 60 accesses the CAM 90. Results of this access are treated differently depending on the operational mode of the data builder. In filter mode, the results are employed for filtering out whereas in promiscuous mode, the results are ignored.

The match state machine 230 generates a match/not-match value, also termed herein an "M signal", which is fed to the output control state machine 195.

Figure 3:
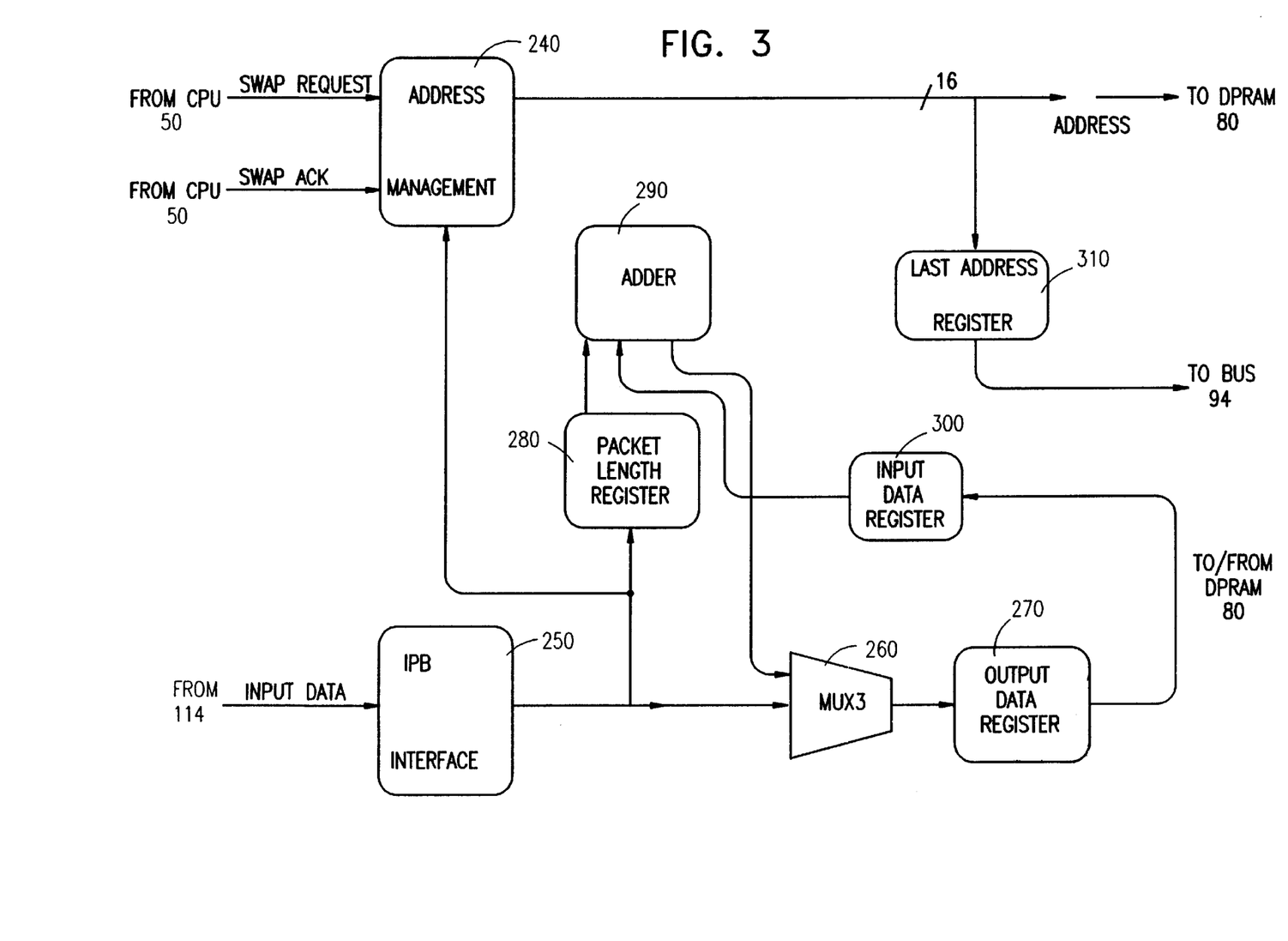
FIG. 3 is a simplified block diagram of the LRAM controller of FIG. 1.

Reference is now made to FIG. 3 which is a detailed block diagram of the LRAM controller 70 of FIG. 1.

As described above, packet memory 80 typically comprises two real or virtual banks and at a given time, one of the banks is being written to by LRAM controller 70 and the other of the two banks is being read from by CPU 50. When the CPU 50 wants to change banks, it asserts a "swap request" signal which is fed to an address management unit 240 in the LRAM controller 70. The address management unit 240 swaps between the banks and returns a "swap acknowledge" signal to the CPU 50.

Also as described above, the LRAM controller 70 does not transfer all packets it receives to the DPRAM 80 but rather only those packets which is not followed by a "packet reject" signal. The aggregation of these packets in the DPRAM 80 comprises a first database, also termed herein the "profile area", storing detailed information regarding the selected subset of packets. Alternatively or in addition, the LRAM controller 70 may write a second database to the DPRAM 80, which stores general per-port information regarding all packets, whether in the selected subset or not. The area of the DPRAM 80 which stores this information is also termed herein the "counter area". Typically, each bank of the DPRAM 80 includes both a counter area and a profile area.

The data builder 70 of FIG. 1 provides data blocks, including four data words and one status word, to the LRAM controller 70 of FIG. 3. The four data words are written directly to the DPRAM 80.

An IPB interface 250 is operative to concatenate to each received status word the corresponding four filter bits received from filters 95 via internal performance bus (IPB) 114 and also the CRC error bit received from CRC machine 110 via IPB 114. The concatenated status word is written to the DPRAM 80.

If the data block is followed by a "data reject" signal, generated by the data builder 60, then the LRAM controller 70 of FIG. 3 rejects the last packet profile from the DPRAM 80 by restoring the DPRAM address pointer to its former location.

Whether or not packet reception is followed by "data reject", the LRAM controller 70 updates the per-port counters in the first area of the DPRAM 80 by performing a read-modify-write operation to the DPRAM 80.

The address management unit 240 generates addresses for the DPRAM 80. When writing to the DPRAM's profile area, address management unit 240 keeps track of the previously written profile in case of "packet reject". When writing to the counter area, the address management unit 240 computes the address within the counter area according to a port number, also termed herein "transmission address" or TA, received from the IPB interface unit 250.

The IPB interface unit 250 receives the data and the status from the data builder 60 and, as described above, concatenates the CRC error bit and filter bits to the status word. The data is sent to the DPRAM 80 via a multiplexer 260 and an output data register 270. The IPB interface unit sends the packet length to a packet length register 280 and sends the transmission address to the address management unit 240.

After the above writing processes take place, the counter area of the DPRAM 80 is updated by reading the port counters into an adder 290 via input data register 300, adding the contents of packet length register 280 to the appropriate counters and writing them back into the DPRAM 80.

A last address register 300 is operative to store the last address written to in one of the two banks while writing in the other bank such that the CPU 50, when reading the data in the first of the two banks, knows which of the data there is valid.

Figure 4:
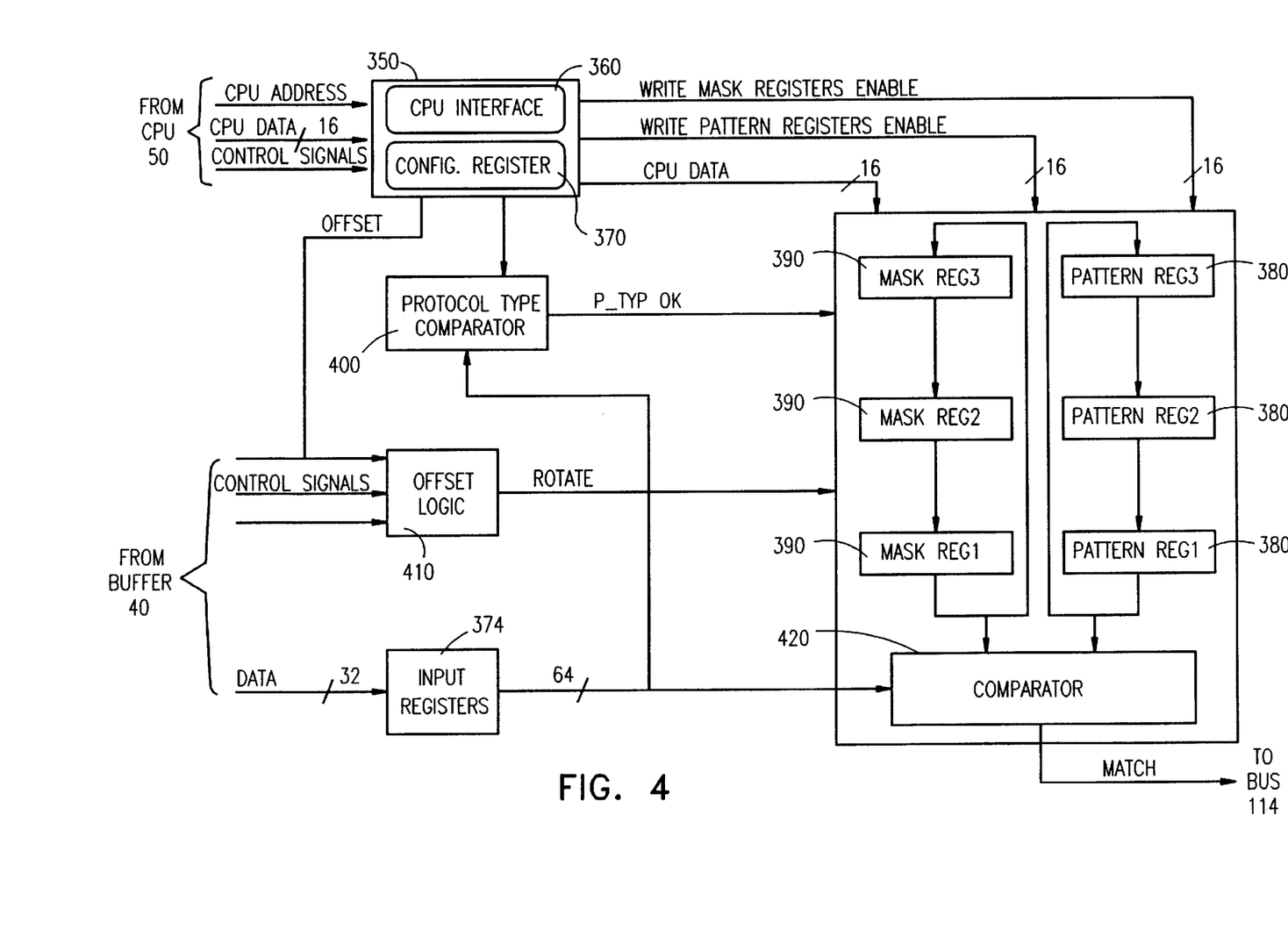
FIG. 4 is a simplified block diagram of one of the filters in the filter array of FIG. 1.

Reference is now made to FIG. 4 which is a detailed block diagram of one of the filters in filter array 95 of FIG. 1. The apparatus of FIG. 4 includes an I/O block 350 which receives input from CPU 50 via a CPU interface 360 and also includes a configuration register 370 which can be written into via the CPU interface 360. The configuration register 370 stores the offset and the protocol type.

A protocol type comparator 400 compares the protocol type assigned to the filter and stored in the configuration register 370 to the protocol type of the received packet. If the packet matches the filter, i.e. if these two protocol types are equal, an offset logic block 410 initializes the above comparison operation according to offset bits stored in the configuration register 370. An input register 374 transforms the format of the input data received from buffer 40 (which may, for example, be 32-bit, 40 MHz) to an internal format, such as 64-bit and 20 MHz.

A pattern register 380 and a mask register 390 form a 3-step shift register with a loop back. Contents of the first registers (Reg1) in pattern and mask register arrays 380 and 390 constantly participate in the comparison. When a packet satisfies the packet type and offset stored in the configuration register 370, the offset logic block 410 issues a "rotate" signal, three times. This causes the data to be rotated, i.e. the content of the first, second and third registers of each of register arrays 380 and 390 is loaded into the third, first and second registers, respectively of the same register array. Thereby, each of the three 64-bit filter and mask words participate in the comparison. A comparator 420 stores the result of comparing each word of the pattern and mask to the packet data. If all three comparison results are "true", the comparator issues a "match" signal. Otherwise, the comparator issues a "not-match" signal.

The registers 380 and 390 are programmed by the I/O block 350.

Figure 5:
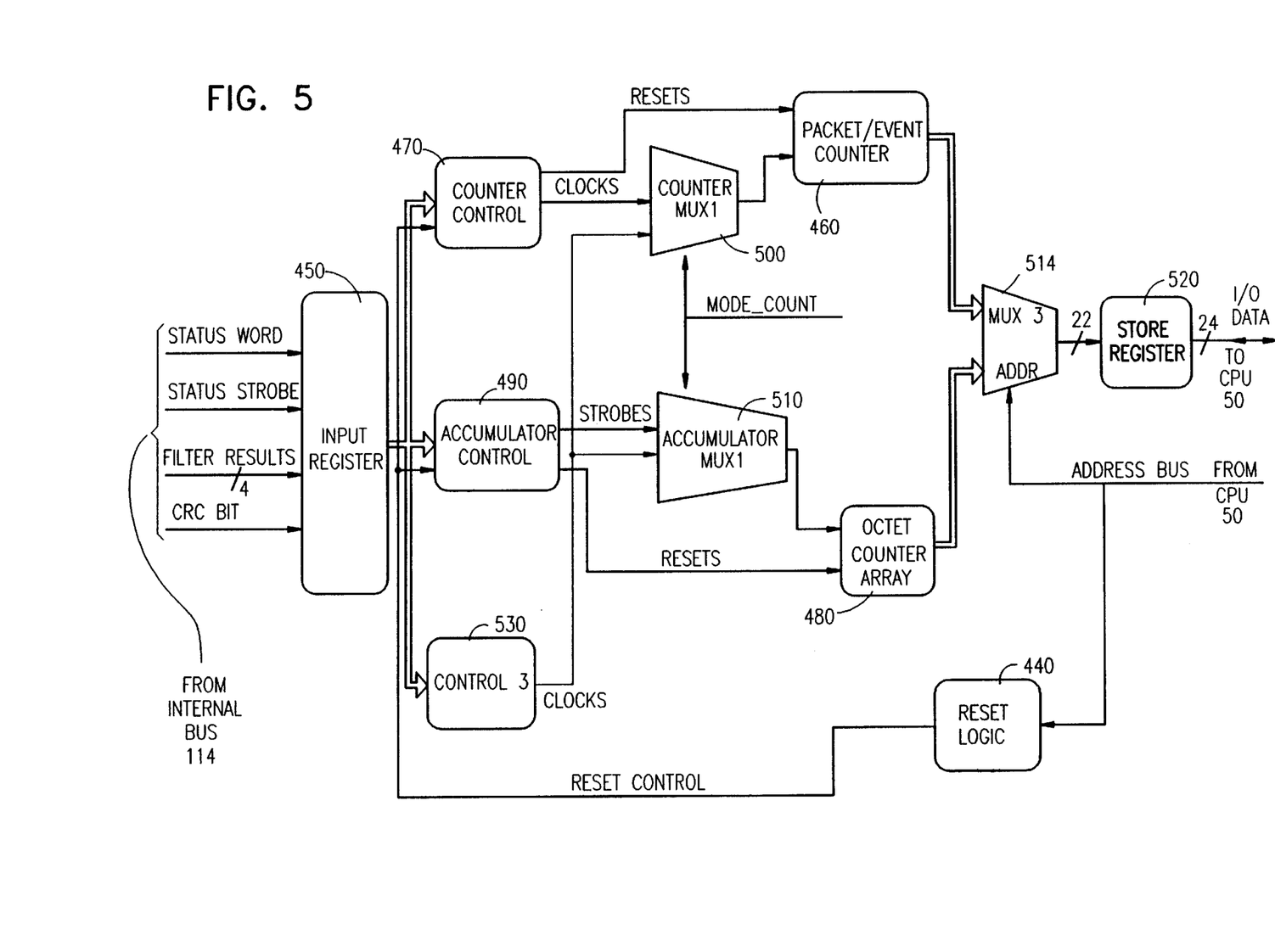
FIG. 5 is a simplified block diagram of each of the counters of FIG. 1.

FIG. 5 is a simplified block diagram of each of counters 100 and 120 of FIG. 1. The apparatus of FIG. 5 operates, therefore, either in a global counting mode or in a filter counting mode. Alternatively, of course, counters 100 and 120 may be implemented separately. Preferably, the counter is read only. The counter is typically in an unpredictable state after reset. A reading of a counter causes the counter to reset. This reset function is performed by reset logic unit 440.

The global counting mode of the apparatus of FIG. 5 is now described. In this mode, the counter of FIG. 5 latches to an input register 450 the relevant bits of the status word generated by data builder 60, the four-bit result of the filter operations of filter 95 and a CRC error bit generated by CRC machine 110.

A packet/event counter array 460 typically includes 5 counters which respectively compute the 5 events described above and termed Counters 1–3, 5 and 7. Each counter is incremented when the appropriate condition is found (such as, for counter1, that a broadcast packet was found) by a first control logic unit 470.

An octet counter array 480 typically includes 3 accumulators which respectively compute the 3 events described above and termed Counters 4, 6 and 8. Each accumulator adds the number of bytes latched from "status word" to the value it currently stores when the appropriate condition is found by a second control logic unit 490.

The first control logic unit 470 searches for increment conditions for each of the 10 counters and supplies each of them by clock signals.

The second control logic unit 490 searches for data adding conditions and supplies strobe signals, at the appropriate time, to the internal registers of the accumulator array 480.

First and second multiplexers 500 and 510 are each operative to multiplex between two sets of clock and/or strobe signals. In global counting mode, the multiplexer 500 selects the output of control unit 470 and the multiplexer 510 selects the output of control unit 490.

A counter from the counter array 460 or an accumulator from the accumulator array 510 currently being read by the CPU, as selected by multiplexer 514 is stored in a store register 520 when the CPU begins the read cycle. The read cycle is long enough to ensure that if the currently read register is being updated, the counter or accumulator may be stored only when its outputs become stable.

The filter counting mode of the apparatus of FIG. 5 is now described. In this mode, the accumulators add 1 in each cycle, thereby operating as counters. The multiplexers 500 and 510 pass to counter array 500 and accumulator array 510 respectively, the contents of a third control unit 530.

The third control unit 530 analyzes the "filter results" input arriving from filter array 95 via input register 450 and supplies a clock or strobe to the appropriate filter counter.

Appendix M is a list of equations useful in computing a 32-bit vector of CRC (cyclic redundancy check) values Q[0], . . . , Q[31] defined according to the IEEE-802.3/Ethernet local area standard from 64-bit parallel input D0, . . . , D63. In Appendix M, Qi (i=0, . . . , 31) is the Q[i] values for the previous clock. For the initial clock, all Qi values may be taken to be 1. Each Q[i] value in Appendix M is followed by a sequence of Di and Qi values which are to be XORed to generate the Q[i] value.

Figure 6:
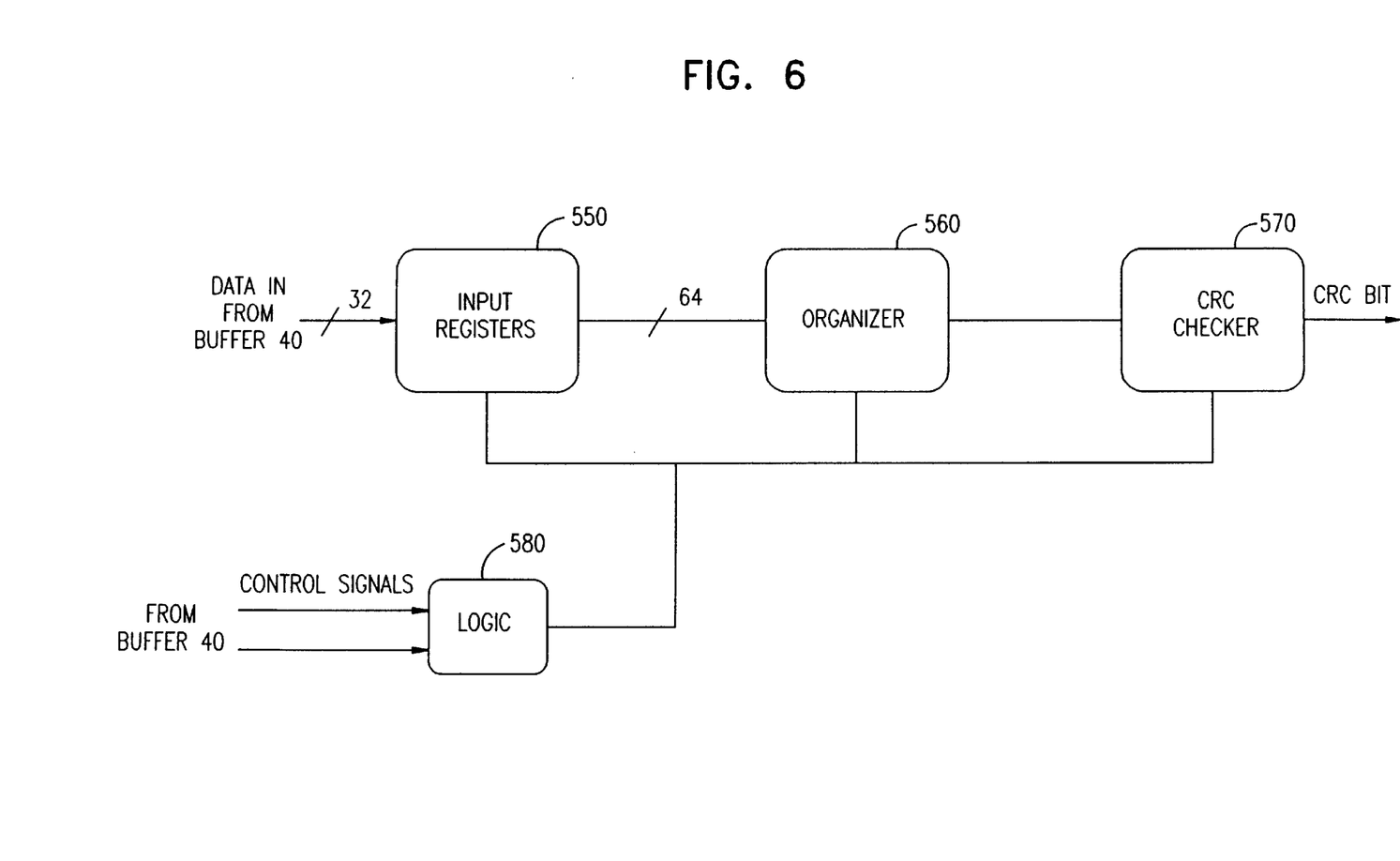
FIG. 6 is a simplified block diagram of the CRC machine of FIG. 1.

FIG. 6 is a simplified block diagram of CRC machine 110 of FIG. 1. The apparatus of FIG. 6 includes an input register 550 which transforms the format of the input data received from buffer 40 (which may, for example, be 32-bit, 40 MHz) to an internal format, such as 64-bit and 20 MHz.

An organizer 560 strips the packet of any data not relevant to the CRC, moves bytes and adds a suffix if necessary to obtain an aligned 64-bit structure, and sends the aligned 64-bit structure to a CRC checker 570 which may be based on the equations of Appendix M. The CRC checker unit checks the packet correctness according to the definition of the IEEE-802.3/Ethernet local area standard and asserts the CRC error bit if the data is not correct. A logic unit 580 synchronizes between units 550, 560 and 570 and the other units of FIG. 1.

Alternatively, if it is desired to check only some of the packets, the CRC machine of FIG. 1 may be based on the 4-bit parallel CRC machine described in "32-bit CRC Error Detection: MACH210 and MACH 230", Application Note by Phil Madison, AT&T-paradyne and Gene Crossley, AMD (Advanced Micro Devices, USA, publication #17750, Rev. A, issue date: May 1993.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A suitable method for generating a preferred embodiment of the present invention, using Appendices A–L, is as follows:

a. Generate an environment including an LET-36 hub, commercially available from Madge Networks (implementing bus 20 of FIG. 1), a plurality of Madge LSE-808 cards (implementing switch cards 14 of FIG. 1) associated with Internet workstations, an NMA-RE agent (implementing CPU 50 of FIG. 1) with at least 8 M memory, version 7.01 or higher, commercially available from Madge Networks NV, and a Sun management station which supports Madge Network's Multiman/OV, as defined in the Multiman user manual.

Generate digital files whose contents is the contents of Appendices B and E–L.

b. Reformat the netlist of the digital file generated from Appendix B from View Logic format to the format of the PCAD circuit layout designer, as described in the View Logic instruction manual;

c. Make the board layout, using the digital files generated from Appendices C and D which specify the component locations on the print and component sides of the board and fabricate the board.

d. Program components U54–U60, U64 and U66 of Appendix A as follows:

i. Use Actel software to generate programming files from the digital files of Appendices H–L. The Actel software is commercially available from Actel Corporation, 955 East Arques Ave., Sunnyvale, Calif. 94086.

ii. Use Actel's programmer to program these components using the above programming files.

In step (f), the U14 and U24 components of Appendix A are programmed.

f. Use Abel software to generate a programming file from the digital files generated from Appendices E and G. The Abel software is commercially available from Data I/O Corporation, 10525 Wilson Road N. E., POB 97046, Redmon, Wash. 98073-9746, USA.

Use Data I/O's programmer to program these components using the above programming files. The Data I/O programmer is commercially available from Data I/O Corporation.

g. Mount all components listed in Appendix A (programmable and non-programmable) onto the board.

h. Install the NMA-RE agent in the hub.

i. Install Multiman/OV, version 3.01 or higher software, commercially available from Madge Networks, in the Sun management station. Run the Multiman program and find the NMA-RE agent on one of its maps, as described in the Multiman manual.

j. Open a UNIX window in the management station. Execute the following commands:

cd/usr/mmov/software mkdir temp mv nmare temp/nmare mv nmars nmare k. Download software extracted in step (j) to the agent, as described in the Multiman manual.

l. Mount connectors J2 and J3 on the NMA-RE memory card, commercially available from Madge Networks NV, and connect the board generated in steps (b)–(g) to the NMA-RE card, via these connectors.

J2 may be a straight female connector (for strip line) 4×17 pins high, 8.5 mm, catalog number SSW-117-01-T-T. J3 may be a straight female connector (for strip line) 3×24 pins high, 8.5 mm, catalog number SSW-124-01-T-T. Both connectors are commercially available from Samtec, Inc., POB 1147, New Albany, Ind. 47151-1147, USA.

m. Connect the board-card assembly generated in steps (h), the Madge LSE-808 cards and the Internet workstations to the hub. Conventional testing equipment, such as the HP-Logic Analyzer, commercially available from Hewlett-Packard, may be connected to components U16–U23 of Appendix A in order to monitor the data arriving at the memory 80. The SMON, commercially available from Madge, may be employed to analyze the data generated by the above system.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. A switch monitoring system comprising:

at least one bus having a plurality of switching ports, wherein a multiplicity of data portions travel over the bus, each of the data portions having at least one destinations;

a plurality of workstations connected to said plurality of switching ports;

a data collection device operative to collect at least one of said data portions directly from said at least one bus which data portion is being transmitted along said at least one bus to at least one destintions including at least one destination other than said data collection device, and wherein said data collection device comprises a plurality of filters in parallel orientation, each filter being operative to filter events out of said data portions, and a filter counter counting any combination of said filtered events.

2. Apparatus according to claim 1 wherein said bus, switching ports and workstations form a LAN.

3. Apparatus according to claim 1 wherein each of said data portions comprises a data packet.

4. A system according to claim 1 wherein said data collection device is associated with said bus by a unidirectional connection allowing information to flow from the bus to the data collection device but not from the data collection device to the bus, thereby to provide passive switch monitoring which has no effect on performance of a switch including said switching ports, in a network to which the switch belongs.

5. A system according to claim 1 and wherein the data collection device also comprises at least one hardware units operative in parallel to process data units arriving at the data collection device.

6. A system according to claim 5 wherein said at least one hardware units operative in parallel comprises a plurality of hardware units operative in parallel.

7. A system according to claim 5 and also comprising a CPU downstream of said at least one hardware units operative to perform software analyses of only a subset of the data portions being transmitted along said bus.

8. A system according to claim 7 wherein the CPU performs software analyses of only a user-selected subset of the data portions being transmitted along said bus.

9. A system according to claim 5 wherein said at least one hardware units are operative, on the fly, to analyze at least one characteristic of all data travelling over the at least one bus.

10. A system according to claim 1 wherein said data collection device is associated with said bus by a unidirectional connection allowing information to flow from the bus to the data collection device but not from the data collection device to the bus, thereby to provide passive switch monitoring which has no effect on performance of a switch including said switching ports, in a network to which the switch belongs.

11. A system according to claim 1 and wherein the data collection device also comprises at least one hardware units operative in parallel to process data units arriving at the data collection device.

12. A system according to claim 11 wherein said at least one hardware units operative in parallel comprises a plurality of hardware units operative in parallel.

13. A system according to claim 11 and also comprising a CPU downstream of said at least one hardware units operative to perform software analyses of only a subset of the data portions being transmitted along said bus.

14. A system according to claim 13 wherein the CPU performs software analyses of only a user-selected subset of the data portions being transmitted along said bus.

15. A system according to claim 11 wherein said at least one hardware units are operative, on the fly, to analyze at least one characteristic of all data travelling over the at least one bus.

16. A system according to claim 1 wherein said data collection device comprises first and second pipelined hardware data collection subunits, the first subunit comprising at least one hardware data collecting units the second subunit comprising at least one hardware data analyzing units operative to receive and analyze data arriving from at least one of said data collecting units.

17. A system according to claim 1 wherein said at least one hardware data collecting units comprise a plurality of parallel hardware data collecting units.

18. A system according to claim 1 wherein said at least one hardware data analyzing units comprise a plurality of parallel hardware data analyzing units.

19. A system according to claim 1 wherein at least one of said hardware units comprises third and fourth pipelined hardware subunits, the third subunit comprising at least one hardware preprocessing units, the fourth subunit comprising at least one hardware postprocessing units operative to receive and process data arriving from at least one of said hardware preprocessing units.

20. A switch monitoring method comprising:
providing at least one bus having a plurality of switching ports, wherein a multiplicity of data portions travel over the bus, each of the data portions having at least one destinations;
connecting a plurality of workstations to said plurality of switching ports; and
providing a data collection device operative to collect at least one of said data portions directly from said at least one bus which data portion is being transmitted along said at least one bus to at least one destinations including at least one destination other than said data collection device,
wherein said data collection device comprises a plurality of filters in parallel orientation, each filter being operative to filter events out of said data portions, and a filter counter counting any combination of said filtered events.

21. A method according to claim 20 wherein said bus, switching ports and workstations form a LAN.

22. A method according to claim 20 wherein each of said data portions comprises a data packet.

23. Data collection apparatus for a switch system including a plurality of workstations connected to at least one bus over which data travels, the data comprising a multiplicity of data portions each having at least one destinations, the apparatus comprising:
a memory; and
data capturing apparatus operative to capture at least one of said data portions directly from said at least one bus, which data portion is being transmitted along said at least one bus to at least one destinations including at least one destination other than said data capturing apparatus and to store said data portion in said memory,
wherein said data collection device comprises a plurality of filters in parallel orientation, each filter being operative to filter events out of said data portions, and a filter counter counting any combination of said filtered events.

24. Apparatus according to claim 23 wherein said data capturing apparatus is operative to collect statistics regarding data portions transferred between stations within said switch system.

25. Apparatus according to claim 23 and wherein said data capturing apparatus also comprises a selective data processor operative to write to said memory information regarding only data portions having a selected profile.

26. Apparatus according to claim 25 wherein said information comprises number of occurrences of said data having said selected profile.

27. Apparatus according to claim 25 wherein said information comprises at least a portion of content of said data having said selected profile.

28. Apparatus according to claim 25 wherein said selective data processor comprises a data filter operative to filter out data transmitted along said at least one bus which does not have said selected profile.

29. Apparatus according to claim 28 wherein said selective data processor comprises a selected data analyzer operative to analyze data which has passed said data filter on the fly, thereby to derive said information.

30. Apparatus according to claim 23 and wherein said data capturing apparatus comprises a total data analyzer operative to analyze, on the fly, at least one characteristic of all data traveling over said at least one bus.

31. A system according to claim 23 wherein said data capturing apparatus comprises first and second pipelined hardware data collection subunits, the first subunit comprising at least one hardware data collecting units, the second subunit comprising at least one hardware data analyzing units operative to receive and analyze data arriving from at least one of said data collecting units.

32. A data collection method for a switch system including a plurality of workstations connected to at least one bus over which data travels, the data comprising a multiplicity of data portions each having at least one destinations, the method comprising:

providing data capturing apparatus operative to capture at least one of said data portions from said at least one bus, which data portion is being transmitted along said at least one bus to at least one destinations including at least one destination other than said data capturing apparatus; and storing said data portion in said memory, wherein said data collection device comprises a plurality of filters in parallel orientation, each filter being operative to filter events out of said data portions, and a filter counter counting any combination of said filtered events.

33. A method according to claim 32 wherein said providing step also comprises collecting statistics regarding data portions transferred between stations within said switch system.

34. A method according to claim 32 and wherein said providing step also comprises a selective data processing step operative to write to said memory information regarding only data portions having a selected profile.

35. A method according to claim 34 wherein said information comprises number of occurrences of said data having said selected profile.

36. A method according to claim 35 wherein said selective data processing step comprises a selected data analysis step operative to analyze data which has passed said data filter on the fly, thereby to derive said information.

37. A method according to claim 34 wherein said information comprises at least a portion of content of said data having said selected profile.

38. A method according to claim 34 wherein said selective data processing step comprises filtering out data transmitted along said at least one bus which does not have said selected profile.

39. Apparatus according to claim 32 and wherein said providing step comprises a total data analysis step operative to analyze, on the fly, at least one characteristic of all data traveling over said at least one bus.

40. A switch monitoring system comprising:

at least one bus having a plurality of switching ports, wherein a multiplicity of data potions travel over the bus, each of the data portions having at least one destinations;

a plurality of workstations connected to said plurality of switching ports; and a data collection device operative to perform and output analyses of only a defined subset of said multiplicity of data portions, wherein said data collection device comprises a plurality of filters in parallel orientation, each filter being operative to filter events out of said data portions, and a filter counter counting any combination of said filtered events.

41. A system according to claim 40 and also comprising a subset definer operative to store a definition of a subset of packets to be processed by the data collection device.

42. A system according to claim 41 wherein the subset definer is operative to receive an indication, from a user, of a subset of packets which are deemed by him to be of interest whereas all packets not within that subset are regarded as not being of interest.

43. A system according to claim 40 wherein the defined subset may be defined at least partly by a designation of at least one of the following packet characteristics:

a packet MAC source address; and a packet MAC destination address.

44. A switch monitoring system comprising:

at least one bus having a plurality of switching ports, wherein a multiplicity of data portions travel over the bus, each of the data portions having at least one destinations;

a plurality of workstations connected to said plurality of switching ports, and a data collection device operative to perform and output analyses of only a defined subset of said multiplicity of data portions, the system also comprising a subset definer operative to store a definition of a subset of packets to be processed by the data collection device, wherein the subset definer is operative to receive an indication, from a user, of a subset of packets which are deemed by him to be of interest whereas all packets not within that subset as regarded as not being of interest; and wherein said data collection device comprises a plurality of filters in parallel orientation, each filter being operative to filter events out of said data portions, and a filter counter counting any combination of said filtered events.

45. A system according to claim 44 wherein the defined subset may be defined at least partly by a designation of at least one of the following packet characteristics:

a packet MAC source address; and a packet MAC destination address.

46. A switch monitoring system comprising:

at least one bus having a plurality of switching ports, wherein a multiplicity of data portions travel over the bus, each of the data portions having at least one destinations;

a plurality of workstations connected to said plurality of switching ports;

a data collection device operative to collect at least one of said data portions from said at least one bus which data portion is being transmitted along said at least one bus to at least one destinations including at least one destination other than said data collection device, said data collection device comprising a plurality of parallel hardware processing units; and wherein said data collection device comprises a plurality of filters in parallel orientation, each filter being operative to filter events out of said data portions, and a filter counter counting any combination of said filtered events.

47. A switch monitoring system comprising:

at least one bus having a plurality of switching ports, wherein a multiplicity of data portions travel over the bus, each of the data portions having at least one destinations;

a plurality of workstations connected to said plurality of switching ports;

a data collection device operative to collect at least one of said data portions from said at least one bus which data portion is being transmitted along said at least one bus to at least one destinations including at least one destination other than said data collection device, wherein said data collection device comprises a plurality of filters in parallel orientation, each filter being operative to filter events out of said data portions, and a filter counter counting any combination of said filtered events.

48. A switch monitoring system comprising:

at least one bus having a plurality of switching ports, wherein a multiplicity of data portions travel over the bus, each of the data portions having at least one destinations;

a plurality of workstations connected to said plurality of switching ports;

a data collection device operative to collect at least one of said data portions from said at least one bus which data portion is being transmitted along said at least one bus to at least one destinations including at least one destination other than said data collection device, wherein said data collection device comprises:

a data builder operative to construct a profile of each arriving data portion, each profile including at least the following profile elements: the data portion's MAC (media access control) destination address, MAC source address and size of the data portion;

a packet memory operative to store at least a subset of said profile elements; and a memory controller operative to transfer at least a subset of said profile elements to said packet memory;

a CPU receiving input from the packet memory and performing software analyses upon the input; and wherein said data collection device comprises a plurality of filters in parallel orientation, each filter being operative to filter events out of said data portions, and a filter counter counting any combination of said filtered events.

49. A system according to claim 48 wherein said data builder is programmable by the CPU.

50. A system according to claim 48 wherein said memory controller is programmable by the CPU.

51. A system according to claim 48 and also comprising a buffer and wherein the data collection device is associated with the bus via the buffer by means of a unidirectional connection allowing information to flow from the bus via the buffer to the data collection device but not from the data collection device to the bus.

52. A system according to claim 48 and also comprising a subset defining memory storing a user's definition of a subset of packets and wherein said memory controller transfers only the subset of said user's definition to the packet memory.

53. A system according to claim 48 and also comprising a filter array including at least one filter defining at least one respective user-defined events.

54. A system according to claim 53 wherein said filter array and said data builder are connected in parallel.

55. A system according to claim 53 wherein said filter array and said data builder are both connected to an internal performance bus.

56. A system according to claim 53 wherein said data checker and said data builder are connected in parallel.

57. A system according to claim 53 wherein said data checker and said data builder are both connected to an internal performance bus.

58. A system according to claim 53 and also comprising a filter counter operative to receive filtered data from the filter array and to count the number of occurrences of any combination of the user-defined events defined by the filter array.

59. A system according to claim 48 and also comprising a data checker operative to check data portions arriving thereat for correctness.

60. A system according to claim 48 and also comprising a global counter generating statistics regarding all traffic travelling over said bus.

61. A system according to claim 48 wherein said global counter is programmable by the CPU.

* * * * *